United States Patent
Tu et al.

(10) Patent No.: US 8,957,446 B2
(45) Date of Patent: Feb. 17, 2015

(54) LIGHT EMITTING DEVICE

(71) Applicant: Lextar Electronics Corporation, Hsinchu (TW)

(72) Inventors: Chien-Hsin Tu, Taipei (TW); Wei-Yi Hsu, Tainan (TW); Kun-Hsiung Wang, Hsinchu County (TW)

(73) Assignee: Lextar Electronics Corporation, Hsinchu (TW)

( * ) Notice: Subject to any disclaimer, the term of this patent is extended or adjusted under 35 U.S.C. 154(b) by 0 days.

(21) Appl. No.: 13/903,292

(22) Filed: May 28, 2013

(65) Prior Publication Data

US 2014/0159087 A1   Jun. 12, 2014

(30) Foreign Application Priority Data

Dec. 6, 2012   (TW) .............................. 101145947 A

(51) Int. Cl.
*H01L 33/00* (2010.01)
*F21K 99/00* (2010.01)
*F21V 3/04* (2006.01)
*F21V 5/00* (2006.01)
*F21V 7/05* (2006.01)
*F21Y 101/02* (2006.01)
*F21V 8/00* (2006.01)

(52) U.S. Cl.
CPC ... *F21K 9/52* (2013.01); *F21V 3/04* (2013.01); *F21V 3/049* (2013.01); *F21V 5/002* (2013.01); *F21V 7/05* (2013.01); *F21Y 2101/02* (2013.01); *G02B 6/0021* (2013.01); *G02B 6/0053* (2013.01); *G02B 6/0073* (2013.01); *G02B 6/0096* (2013.01)
USPC ............... 257/98; 257/E33.072; 257/E33.074

(58) Field of Classification Search
USPC .............................. 257/98, E33.074, E33.072
See application file for complete search history.

(56) References Cited

U.S. PATENT DOCUMENTS

| 5,349,210 A | * | 9/1994 | Ackley et al. ................... 257/84 |
| 2010/0224248 A1 | * | 9/2010 | Kenney et al. ................ 136/259 |
| 2011/0063855 A1 | | 3/2011 | Vissenberg |

FOREIGN PATENT DOCUMENTS

| TW | M288474 | 3/2006 |
| TW | 200827775 | 7/2008 |
| TW | M429835 | 5/2012 |

OTHER PUBLICATIONS

English Abstract translation of TWM288474 (Published Mar. 1, 2006).
TW Office Action dated Oct. 30, 2014.
English Abstract translation of TW200827775 (Published Jul. 1, 2008).

* cited by examiner

*Primary Examiner* — Victor A Mandala
(74) *Attorney, Agent, or Firm* — McClure, Qualey & Rodack, LLP

(57) ABSTRACT

A light emitting device comprising a carrier, a first and a second reflective layers, a first and a second micro-structures, a LED package device, a light guide device and a light directing cover is provided. The carrier comprises an upper plate and a lower plate each having a first surface and a second surface. The lower plate has a through hole. The first and second reflective layers are formed on the edges of the second surface of the upper plate and the first surface of the lower plate, respectively. The first and second micro-structures are formed on the edges of the second surface of the upper plate and the first surface of the lower plate, respectively. The LED package device is disposed below the through hole. The light guide device is connected to the LED package device. The light directing cover surrounds the light guide device.

14 Claims, 1 Drawing Sheet

LIGHT EMITTING DEVICE

This application claims the benefit of Taiwan application Serial No. 101145947, filed Dec. 6, 2012, the subject matter of which is incorporated herein by reference.

BACKGROUND OF THE INVENTION

1. Field of the Invention

The invention relates in general to a light emitting device, and more particularly to a light emitting device capable of providing uniform lateral light output.

2. Description of the Related Art

Along with the advance and development of the light emitting diode (LED) technology, the applications of LED in light emitting devices, such as residential illumination devices, have become a focus of research. Currently, most illumination devices adopt direct forward illumination. However, for the purpose of residential illumination, the light of indirect illumination (such as lateral illumination) is preferred, because it is gentle and provides a homelike feeling.

Therefore, how to provide a residential illumination device having uniform lateral light output has become a prominent task for the industries.

SUMMARY OF THE INVENTION

The invention is directed to a light emitting device, wherein a light is emitted after passing through a light guide device and being refracted towards a light directing cover, such that the effect of a uniform lateral light output of the light emitting device can be achieved.

According to one embodiment of the present invention, a light emitting device is provided. The light emitting device comprises a carrier, a first reflective layer, a second reflective layer, a first micro-structure, a second micro-structure, a light emitting diode (LED) package device, a light guide device and a light directing cover. The carrier comprises an upper plate and a lower plate separated from each other by a distance, wherein the lower plate has a through hole, each of the two plates has a first surface and a second surface, and each of the two plates has a first surface and a second surface disposed oppositely to each other. The first reflective layer and the second reflective layer are formed on the edges of the second surface of the upper plate and the first surface of the lower plate, respectively. The first micro-structure and the second micro-structure are formed on the edges of the second surface of the upper plate and the first surface of the lower plate, respectively. The LED package device is disposed below the through hole of the lower plate. The light guide device penetrates through the through hole and is connected to the LED package device. The light directing cover is disposed on a peripheral region between the upper plate and the lower plate and surrounds the light guide device.

The above and other aspects of the invention will become better understood with regard to the following detailed description of the preferred but non-limiting embodiment(s). The following description is made with reference to the accompanying drawings.

DETAILED DESCRIPTION OF THE INVENTION

A number of embodiments disclosed below relate to a light emitting device, wherein a light is emitted after passing through a light guide device and being refracted towards a light directing cover, such that the effect of a uniform lateral light output of the light emitting device can be achieved. However, the embodiments of the invention are for detailed descriptions only, not for limiting the scope of protection of the invention. Anyone who is skilled in the technologies of the invention can make variations or modifications to detailed descriptions according to actual needs in the implementations of the invention.

Figure 1A:
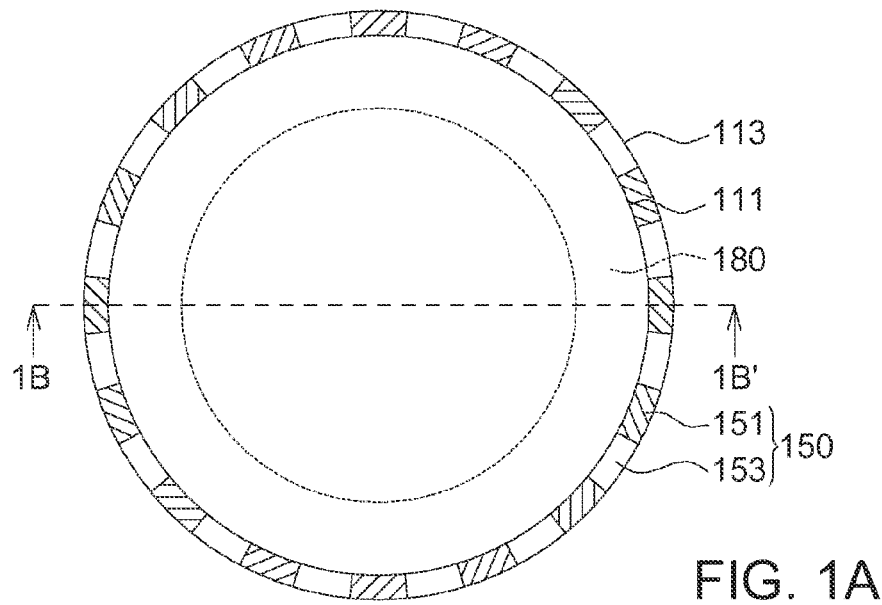
FIG. 1A shows a top view of a light emitting device according to an embodiment of the invention.
Figure 1B:
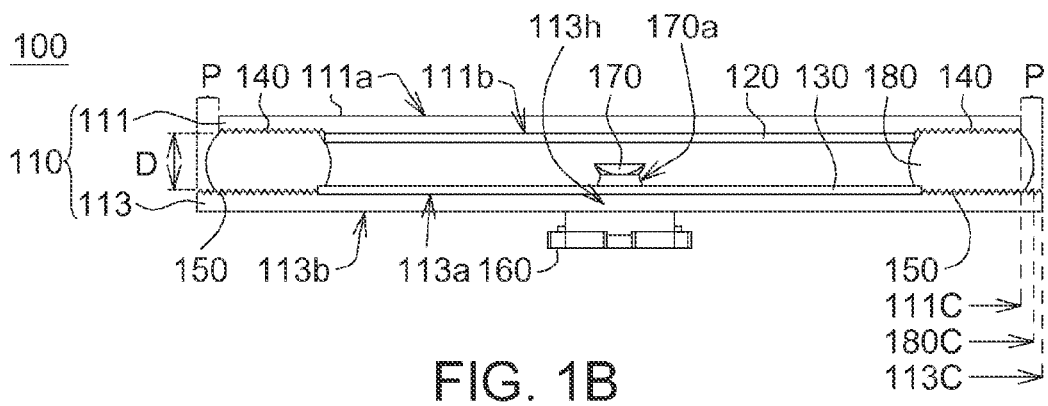
FIG. 1B shows a cross-sectional view along a cross-sectional line of FIG. 1A.

FIG. 1A shows a top view of a light emitting device according to an embodiment of the invention. FIG. 1B shows a cross-sectional view along a cross-sectional line of FIG. 1A. The light emitting device 100 comprises a carrier 100, a first reflective layer 120, a second reflective layer 130, a first micro-structure 140, a second micro-structure 150, an LED package device 160, a light guide device 170, and a light directing cover 180. The carrier 100 comprises an upper plate 111 and a lower plate 113 separated from each other by a distance D. The lower plate 113 has a through hole 113h, the upper plate 111 has a first surface 111a and a second surface 111b, the lower plate 113 has a first surface 113a and a second surface 113b, and the second surface 111b of the upper plate 111 and the first surface 113a of the lower plate 113 are disposed oppositely to each other. The first reflective layer 120 and the second reflective layer 130 are formed on the edge of the second surface 111b of the upper plate 111 and on the edge of the first surface 113a of the lower plate 113, respectively. The first micro-structure 140 and the second micro-structure 150 are formed on the edge of the second surface 111b of the upper plate 111 and on the edge of the first surface 113a of the lower plate 113, respectively. The LED package device 160 is disposed below the through hole 113h of the lower plate 113. The light guide device 170 penetrates through the through hole 113h and is connected to the LED package device 160. The light directing cover 180 is disposed on the peripheral region between the upper plate 111 and the lower plate 113 and surrounds the light guide device 170. In the embodiment, the light emitted by the LED package device 160 passes through the light guide device 170 which further refracts the light to the light directing cover 180 from which the light is outputted, such that a uniform lateral light output can be achieved.

In the embodiment, the materials of the upper plate 111 and the lower plate 113 comprise, for example, a thermal resistant ceramic material or an aluminum containing material, such that the upper plate 111 and the lower plate 113 have excellent heat dissipation properties, and the damage to the entire device caused by high temperature is reduced.

In the embodiment, the first reflective layer 120 and the second reflective layer 130 are formed of, such as, a material with high reflectivity for effectively increasing the output effect and the uniformity of the light. In an embodiment, the first reflective layer 120 and the second reflective layer 130 are formed of, such as, silver or titanium dioxide; for example, the first reflective layer 120 and the second reflective layer 130 may be micron level silver layers. In practical applications, the selections of the materials for forming the first reflective layer 120 and the second reflective layer 130 may vary depending on actual needs as long as the selected material has high reflectivity.

In the embodiment, the first micro-structure 140 and the second micro-structure 150 are provided for converging the light and preventing the light from being diverged, rendering the light output more uniform and an effective increase of the light output effect. As indicated in FIG. 1B, the first micro-structure 140 and the second micro-structure 150 are such as roughened surfaces. The first micro-structure 140 and the second micro-structure 150 can guide the light towards the light directing cover 180, such that the point light sources can achieve a uniform light output, similar to that achieved by a surface light source. In the embodiment as indicated in FIG. 1B, the first micro-structure 140 abuts against the first reflective layer 120, and the second micro-structure 150 abuts against the second reflective layer 130. In the embodiment, the first micro-structure 140 surrounds the first reflective layer 120, and the second micro-structure 150 surrounds the second reflective layer 130.

In the embodiment as indicated in FIGS. 1A-1B, the area of the second surface 111b of the upper plate 111 is smaller than the area of the first surface 113a of the lower plate 113 for exposing a portion P of the second micro-structure 150.

In the embodiment as indicated in FIG. 1A, the second micro-structure 150 has a plurality of first areas 151 and a plurality of second areas 153. The structure of the first areas 151 is different from the structure of the second areas 153. For example, the first areas 151 are provided with a roughened surface, and the second areas 153 are provided with a flat surface, such that the light is converged on the first areas 151.

In an embodiment, the LED package device 160 may be a chip on board (COB) type LED package device. The COB type LED package device can change the optical paths of most of the forward lights and turn them into lateral lights.

In the embodiment as indicated in FIG. 1B, the light guide device 170 has a lens with a concaved lateral surface 170a for emitting a light from the concaved lateral surface 170a. In the embodiment, the LED package device 160 is disposed below the through hole 113 and the light guide device 170. As a light emits upwards, the light can be emitted from the concaved lateral surface 170a of the light guide device 170 and turns into a lateral emitting light.

In the embodiment as indicated in FIG. 1A, the light directing cover 180 has such as a hollowed structure. It should be noted that the hollowed structure of the light directing cover 180 is FIG. 1A is illustrated with dotted lines in a perspective way. In the embodiment as indicated in FIG. 1A, the outline of the light directing cover 180 is such as circular. The circular structure in conjunction with the hollowed structure makes the light guiding area of the light emitting device 100 become ring-shaped, such that the light is uniform inside the light directing cover 180 (the light guiding area) and a uniform lateral light output can be further provided. Moreover, it is easy to manufacture such simple structure of the light directing cover 180, and it is beneficial to a mass production. In alternative embodiments, the outline of the light directing cover 180 may be oval, rectangular, squared, rhombus, or polygonal. The geometric shapes of the outline affect the angle of light output, and the selections of the outline shapes may vary according to actual needs and are not limited to the above exemplification.

In the embodiment as indicated in FIG. 1A, the light directing cover 180 is located between the first micro-structure 140 and the second micro-structure 150. In the embodiment, the range that light directing cover 180 covers overlaps the area of the first micro-structure 140. In the embodiment as indicated in FIG. 1A, the edge 180C of the light directing cover 180 is located between the edge 111C of the upper plate 111 and the edge 113C of the lower plate 113.

Figure 2:
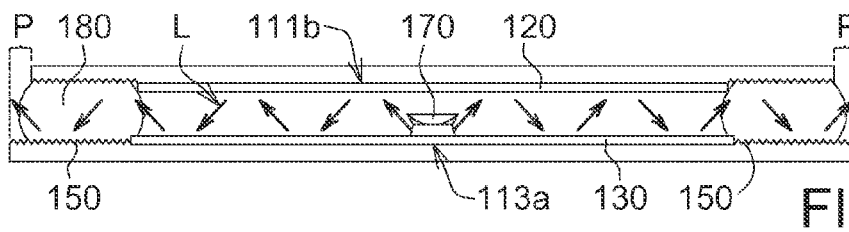
FIG. 2 shows an optical path of a light emitting device according to an embodiment of the invention.

FIG. 2 shows an optical path of a light emitting device according to an embodiment of the invention. As indicated in FIG. 2, the light L is emitted from the concaved lateral surface 170a and forms a lateral light output. The first reflective layer 120 and the second reflective layer 130 refract the light L towards the light directing cover 180 from which the light L is outputted from the light emitting device 100 to provide uniform lateral illumination.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light emitting device, comprising:
   a carrier comprising an upper plate and a lower plate separated from each other by a distance, wherein the lower plate has a through hole, each of the two plates has a first surface and a second surface, and the second surface of the upper plate and the first surface of the lower plate are disposed oppositely to each other;
   a first reflective layer and a second reflective layer formed on the second surface of the upper plate and the first surface of the lower plate, respectively;
   a first micro-structure and a second micro-structure formed on the edge of the second surface of the upper plate and the edge of the first surface of the lower plate, respectively;
   a light emitting diode (LED) package device disposed below the through hole of the lower plate;
   a light guide device penetrating through the through hole and connected to the LED package device; and
   a light directing cover disposed on a peripheral region between the upper plate and the lower plate and surrounding the light guide device.

2. The light emitting device according to claim 1, wherein the materials of the upper plate and the lower plate comprise a thermal resistant ceramic material or an aluminum containing material.

3. The light emitting device according to claim 1, wherein the first reflective layer and the second reflective layer are formed of a material with high reflectivity.

4. The light emitting device according to claim 3, wherein the first reflective layer and the second reflective layer are formed of silver or titanium dioxide.

5. The light emitting device according to claim 1, wherein the first micro-structure is a roughened surface, and the second micro-structure is another roughened surface.

6. The light emitting device according to claim 1, wherein the first micro-structure surrounds the first reflective layer, and the second micro-structure surrounds the second reflective layer.

7. The light emitting device according to claim 1, wherein the first micro-structure abuts against the first reflective layer, and the second micro-structure abuts against the second reflective layer.

8. The light emitting device according to claim 1, wherein the area of the second surface of the upper plate is smaller than the area of the first surface of the lower plate for exposing a portion of the second micro-structure.

9. The light emitting device according to claim 8, wherein the second micro-structure has a plurality of first areas and a plurality of second areas, and the structure of the first areas is different from the structure of the second areas.

10. The light emitting device according to claim 1, wherein the LED package device is a chip on board (COB) type LED package device.

11. The light emitting device according to claim 1, wherein the light guide device has a lens with a concaved lateral surface for emitting a light from the concaved lateral surface.

12. The light emitting device according to claim 1, wherein the light directing cover has a hollowed structure, and the outline of the light directing cover is circular, oval, rectangular, squared, rhombus, or polygonal.

13. The light emitting device according to claim 1, wherein the light directing cover is located between the first micro-structure and the second micro-structure.

14. The light emitting device according to claim 1, wherein the edge of the light directing cover is located between the edge of the upper plate and the edge of the lower plate.

* * * * *